United States Patent [19]
Homann et al.

[11] Patent Number: 5,641,196
[45] Date of Patent: Jun. 24, 1997

[54] ROOF CONSTRUCTION FOR A MOTOR VEHICLE

[75] Inventors: Bodo Homann, Heimsheim; Jürgen Bayer, Weissach; Harry Nennemann, Leinfelden-Echterdingen, all of Germany

[73] Assignee: Dr. Ing. h.c.F. Porsche AG, Weissach, Germany

[21] Appl. No.: 554,713

[22] Filed: Nov. 7, 1995

[30] Foreign Application Priority Data

Nov. 15, 1994 [DE] Germany ............ 44 40 730.0

[51] Int. Cl.⁶ ...................................... B60J 7/053
[52] U.S. Cl. .................. 296/222; 296/214; 49/462
[58] Field of Search .................... 296/214, 222; 49/383, 462

[56] References Cited

U.S. PATENT DOCUMENTS

| | | | |
|---|---|---|---|
| 3,380,193 | 4/1968 | Hill | 49/462 |
| 3,513,595 | 5/1970 | Mills | 49/462 |
| 4,720,138 | 1/1988 | Schlapp et al. | 296/222 |

FOREIGN PATENT DOCUMENTS

| | | |
|---|---|---|
| 0286952A2 | 10/1988 | European Pat. Off. . |
| 0442773A1 | 8/1991 | European Pat. Off. . |
| 951505 | 10/1956 | Germany ............ 49/383 |
| 3442652 | 6/1986 | Germany ............ 296/214 |
| 4335653A1 | 4/1995 | Germany . |
| 2167357 | 5/1986 | United Kingdom . |

OTHER PUBLICATIONS

European Search Report Feb. 13, 1996 Europe.

*Primary Examiner*—Dennis H. Pedder
*Attorney, Agent, or Firm*—Evenson McKeown Edwards & Lenahan PLLC

[57] ABSTRACT

A roof construction includes a movable roof section which, after being lowered, can be displaced under a fixed roof section. Viewed in the forward driving direction, a protective and covering strip is provided on the rear edge of the movable roof section. This protective and covering strip covers the connection area between the two roof sections on the one hand and, on the other hand, covers a gap which is formed when the movable roof section is lowered.

20 Claims, 3 Drawing Sheets

ROOF CONSTRUCTION FOR A MOTOR VEHICLE

BACKGROUND AND SUMMARY OF THE INVENTION

This invention relates to a roof construction for a motor vehicle of the type wherein a movable roof section can be displaced after being lowered under a rigid roof section.

From German Patent Application P 43 35 653.2—corresponding to U.S. patent application Ser. No. 08/324,395, filed Oct. 17, 1994, which is not prior art, a body for a passenger car is disclosed in the case of which a movable second roof section can be slid under a third roof section by means of suitable kinematics. When the roof is opened up, as a result of the lowering and displacement of the second roof section, a gap is formed between the two roof sections.

It is an object of the invention to further develop this roof construction such that an unintentional reaching into the gap by occupants sitting, for example, in the rear compartment of the vehicle is counteracted and the aesthetic effect in the transition area between the two roof sections is improved.

According to the invention, this object is achieved by providing a roof construction comprising a rigid roof section, a movable roof section which can be displaced after being lowered under the rigid roof section, and a protective and covering strip mounted on a rear edge of the movable roof section as viewed in a forward vehicle driving direction, wherein the protective and covering strip has a first strip area fastened on an interior side of the movable roof section and a second free strip area which projects rearwardly beyond the movable roof section, said second free strip area being connected in a hinged manner with the first area and being resiliently prestressed in such a manner that, when the movable roof section is lowered, the second strip area is automatically erected and covers a gap forming between the movable roof section and the rigid roof section.

Principal advantages achieved by means of the invention are that, as a result of the mounting of a protective or covering strip, the occupants are prevented from inserting their fingers in the gap between the two roof sections so that the risk of injury is at least reduced. This strip ensures an organic covering of the transition area between the second and the third roof section, specifically within the passenger compartment. In other words, it contributes to the optimization of the appearance. In addition, the strip is used for the lateral deflection of water, which penetrated into the gap between the roof sections from water draining grooves arranged in the area of the lateral roof frames. The protective and covering strip can be manufactured at reasonable cost, is easy to mount and is operationally reliable.

The rear edge of the second and the front edge of the third roof section are provided with hollow profile strips which are used for reinforcing the roof construction, for receiving sealing profiles and as a stop for the protective and covering strip having a first and a second strip area. When the roof is opened up, the second roof section is first lowered to such an extent that it can be slid under the hollow profile strip of the third roof section. In this case, a gap is created between the two roof sections which is essentially covered by the automatically erected second strip area.

The protective and covering strip may be manufactured of a plastic material in one or several parts. The prestressing is preferably achieved by a suitable shaping of the one-piece or multiple-piece plastic part. It may also be achieved by corresponding resilient insertions according to other contemplated embodiments.

Other objects, advantages and novel features of the present invention will become apparent from the following detailed description of the invention when considered in conjunction with the accompanying drawings.

DETAILED DESCRIPTION OF THE DRAWINGS

Figure 1:
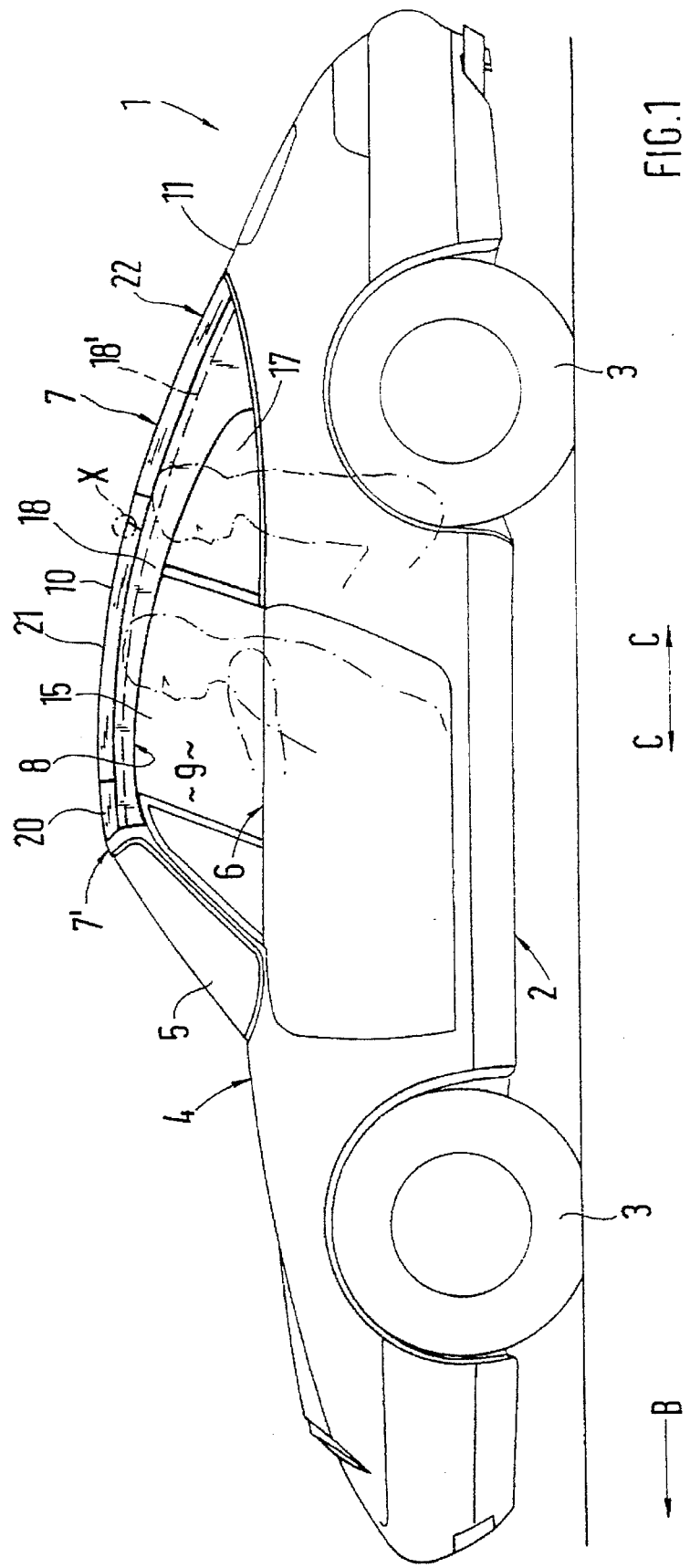
FIG. 1 is a lateral schematic view of a passenger car having a roof construction constructed according to a preferred embodiment of the present invention.

The passenger car 1 according to FIG. 1 comprises a body 2 which is carried by wheels 3. The body 2 is formed by a basic body 4 with a windshield 5 and a belt line 6. The basic body 4 is provided with a top 7 which is connected to an upper windshield frame 7' and the belt line 6, and covers a passenger compartment 9 by means of a roof section 8. A roof line 10, which extends approximately along the longitudinal center plane of the passenger car, extends between the windshield frame part 7' and a rear opening 11 in a curve which slopes down in the driving direction B but is continuous, so that the top 2 has the shape of a coupe with a fast back.

Figure 2:
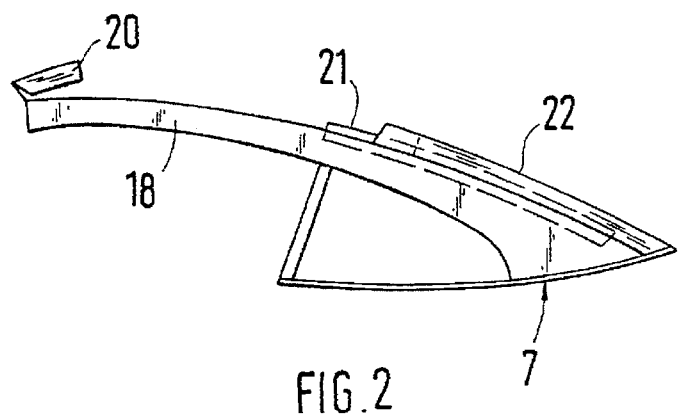
FIG. 2 is a partial view showing a movable roof assembly of the passenger car of FIG. 1.

The top 7 has lateral roof frames 18 bounding the side windows 15, 17, between which—viewed in the longitudinal direction C—C of the vehicle—a first roof section 20, a second roof section 21 and a third roof section 22 are provided behind one another (see FIG. 2). The lateral roof frames 18 are provided with water draining grooves 18' whose constructive design is shown as an example in FIG. 4. The first roof section 20 may be used as a draft deflector. The second roof section 21 is constructed to be longitudinally movable in the manner of a sliding roof such that it can be displaced under the third roof section 22. The third roof section 22 is fixedly inserted in the top 7.

Figure 3:
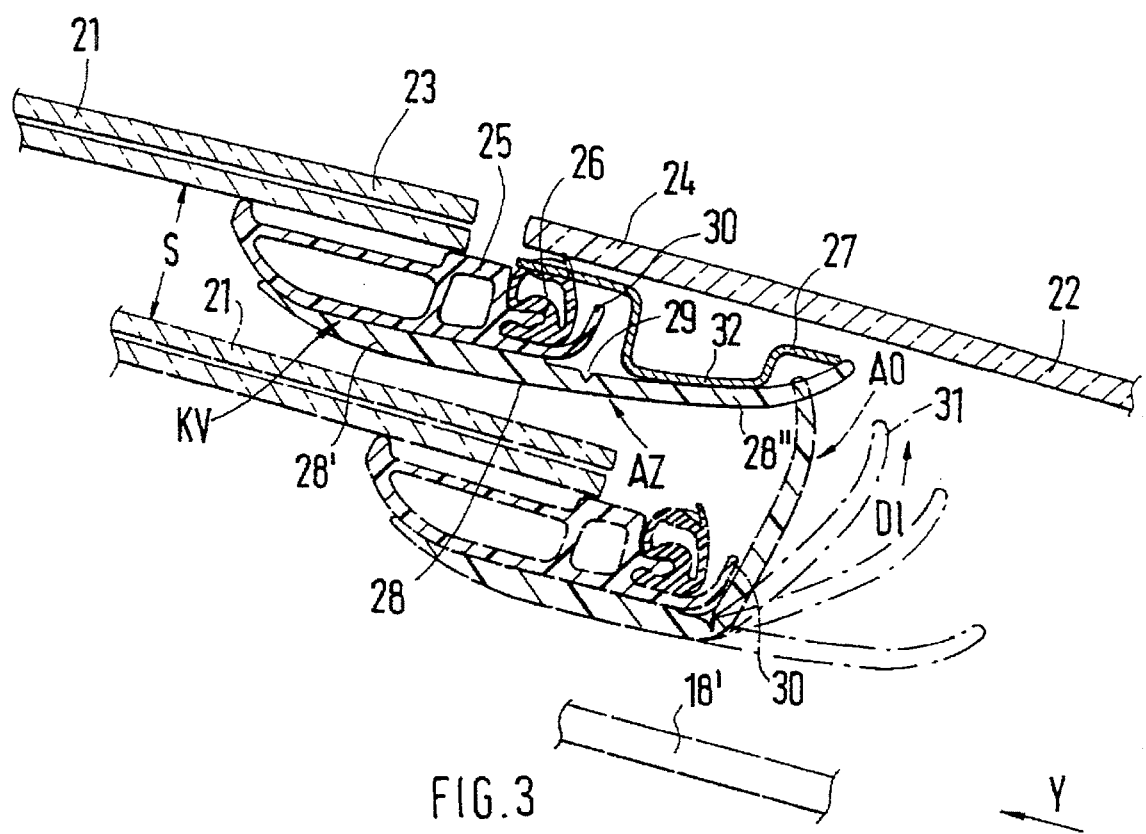
FIG. 3 is an enlarged detail X of FIG. 1.

FIG. 3 illustrates the method of operation of the invention. The rear edge 23 of the second roof section 21 and the front edge 24 of the third roof section 22 is provided with hollow profile strips 25, 27 which are used for reinforcing the roof construction. The hollow profile strip 25 is fastened to the second roof section 21 by gluing. A sealing strip 26 is carried by profile strip 25, which sealing strip 26 engages profile strip 27 when the second roof section is in the closed position.

Figure 4:
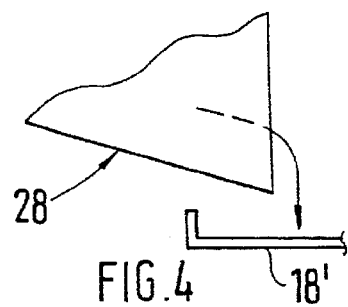
FIG. 4 is a view in the direction of the arrow Y of FIG. 3.

When the roof is opened up, the second roof section 21 is first lowered to such an extent that it can be slid under the hollow profile strip 27 of the third roof section 22. This creates a gap S between the two roof sections. A protective and covering strip 28 is fastened on the hollow profile strip 25 of the second roof section 21 by means of a first strip area 28' A free, second strip area 28" of the covering strip 28, which projects beyond the end 23 of the roof section 21, is fastened to the first strip area 28' in a hinged manner and is resiliently prestressed in the manner of a spring in the direction D1 of the interior side of the roof such that, when the roof section 21 is lowered, the second strip area 28" is automatically erected and covers the gap S which forms between the roof sections 21, 22. So that the water which penetrated between the second roof section 21 and the third roof section 22 is carried off effectively, the ends of the protective and covering strip 28 extend above the water draining grooves 18'. The water to be carried off approximately follows the arrow (FIG. 4).

Figure 5:
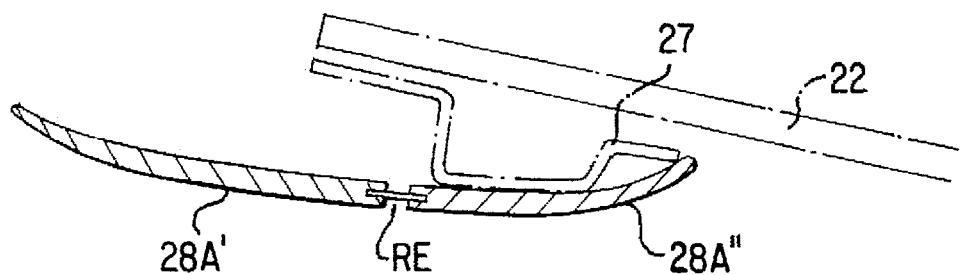
FIG. 5 is a schematic depiction of a protective and covering strip constructed according to another embodiment including two separately manufactured strip areas connected together by a resilient element.

The protective and covering strip 28 consists of plastic and is made of one piece. The prestressing of the second strip area 28" is caused by a suitable shaping. The prestressing also may be promoted by correspondingly constructed additional, spring-like elements according to other contemplated embodiments of the invention. FIG. 5 schematically depicts an embodiment where the protective and covering strip is made with two strip areas 28A' and 28A" formed in separate manufacturing processes and connected together by a resilient element RE.

By means of a glued connection KV, the hollow profile strip 25 carries the first strip area 28'. The hollow profile strip forms a stop 30 for the second strip area 28".

Figure 6:
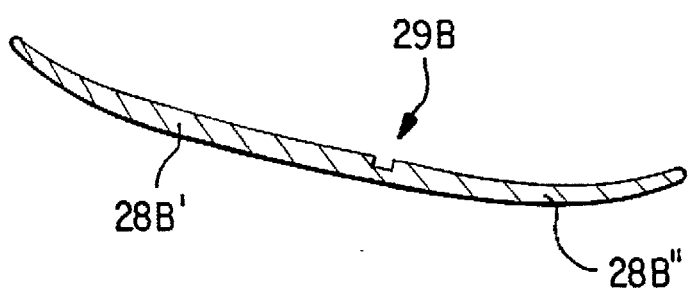
FIG. 6 is a schematic depiction of a further embodiment of a protective and covering strip according to the invention, including a U-shaped recess between two strip areas.

In the closed position of the roof section 21, the second strip area 28" rests against section 32 of the hollow profile strip 27—operating position closed AZ. When the roof section 21 is lowered or opened up, the now upright strip area 28" will comes to rest against the stop 30 of the hollow profile strip 25—operating position open AO—. As a result, it is ensured that the end 31 of the strip area 28" extends at a distance from the roof section 22. The recess 29—which may be wedge-shaped or U-shaped and is empirically determined—is selected in the protective and covering strip 28 in such a manner that the free strip area 28" comes to rest against the stop 30. FIG. 6 schematically depicts an embodiment where the protective and covering strip is made with a U-shaped recess 29B between the strip areas 28B' and 28B".

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Roof construction for a motor vehicle, comprising:

a rigid roof section, a movable roof section which can be displaced after being lowered under the rigid roof section, and a protective and covering strip mounted on a rear edge of the movable roof section as viewed in a forward vehicle driving direction, wherein the protective and covering strip has a first strip area fastened on an interior side of the movable roof section and a second free strip area which projects rearwardly beyond the movable roof section, said second free strip area being connected in a hinged manner with the first area and being resiliently prestressed in such a manner that, when the movable roof section is lowered, the second strip area is automatically erected and at least partially covers a gap formed between the movable roof section and the rigid roof section.

2. Roof construction according to claim 1, wherein the protective and covering strip is made of plastic in one piece.

3. Roof construction according to claim 1, wherein the protective and covering strip is made of plastic in several pieces.

4. Roof construction according to claim 1, wherein the resilient prestressing is caused by the shaping of the two strip areas with respect to one another.

5. Roof construction according to claim 2, wherein the resilient prestressing is caused by the shaping of the two strip areas with respect to one another.

6. Roof construction according to claim 1, wherein the resilient prestressing is caused by resilient elements.

7. Roof construction according to claim 3, wherein the resilient prestressing is caused by resilient elements.

8. Roof construction according to claim 1, wherein a recess is provided between the two strip areas, which permits a targeted angular positioning of the second strip area with respect to a stop of a hollow profile strip fixed to the movable roof section.

9. Roof construction according to claim 2, wherein a recess is provided between the two strip areas, which permits a targeted angular positioning of the second strip area with respect to a stop of a hollow profile strip fixed to the movable roof section.

10. Roof construction according to claim 8, wherein the recess is wedge-shaped.

11. Roof construction according to claim 9, wherein the recess is wedge-shaped.

12. Roof construction according to claim 1, wherein the protective and covering strip extends transversely to the forward driving direction of the motor vehicle to above water draining grooves extending in a longitudinal direction of the vehicle.

13. Roof construction according to claim 2, wherein the protective and covering strip extends transversely to the forward driving direction of the motor vehicle to above water draining grooves extending in a longitudinal direction of the vehicle.

14. Roof construction according to claim 4, wherein the protective and covering strip extends transversely to the forward driving direction of the motor vehicle to above water draining grooves extending in a longitudinal direction of the vehicle.

15. Roof construction according to claim 5, wherein a recess is provided between the two strip areas, which permits a targeted angular positioning of the second strip area with respect to a stop of a hollow profile strip fixed to the movable roof section.

16. Roof construction according to claim 15, wherein the recess is wedge-shaped.

17. Roof construction according to claim 16, wherein the protective and covering strip extends transversely to the forward driving direction of the motor vehicle to above water draining grooves extending in a longitudinal direction of the vehicle.

18. Roof construction according to claim 8, wherein the recess is U-shaped.

19. Roof construction according to claim 9, wherein the recess is U-shaped.

20. Roof construction according to claim 15, wherein the recess is U-shaped.

* * * * *